United States Patent

Stappaerts

[11] 4,280,109
[45] Jul. 21, 1981

[54] EFFICIENT FREQUENCY CONVERTER UTILIZING HIGHER ORDER STOKES-RAMAN SCATTERING

[75] Inventor: Eddy A. Stappaerts, Redondo Beach, Calif.

[73] Assignee: Northrop Corporation, Los Angeles, Calif.

[21] Appl. No.: 96,750

[22] Filed: Nov. 23, 1979

[51] Int. Cl.³ .............................................. H01S 3/30
[52] U.S. Cl. ............................ 331/94.5 N; 307/425; 307/426
[58] Field of Search ..................... 331/94.5 N, 94.5 C; 307/425, 426

[56] References Cited
U.S. PATENT DOCUMENTS 3,546,477  12/1970  Hokryo .................................. 307/425

Primary Examiner—William L. Sikes
Assistant Examiner—Léon Scott
Attorney, Agent, or Firm—Edward A. Sokolski

[57] ABSTRACT

A device for translating the frequency of the energy contained in a laser beam. Higher order Raman scattering is utilized to convert the energy in a laser beam into a collimated beam of radiation at a frequency removed from that of the original beam by an amount corresponding to the frequency shift exhibited by higher order Raman scattering processes. A Raman cell is utilized as a saturated amplifier at power density levels below that required for oscillation, so as to obtain efficient conversion. By selecting the path length within the Raman cell, nearly all of the energy exiting the cell is caused to appear in a single, higher order Stokes wave.

5 Claims, 2 Drawing Figures

EFFICIENT FREQUENCY CONVERTER UTILIZING HIGHER ORDER STOKES-RAMAN SCATTERING

BACKGROUND OF THE INVENTION

1. Field of the Invention

This invention pertains to the generation of coherent electromagnetic radiation by the frequency conversion of laser radiation. In particular, this invention utilizes higher order vibrational or rotational Raman scattering to obtain efficient frequency conversion.

2. Description of the Prior Art

Frequency conversion of laser beams by means of vibrational or rotational Raman scattering is well known. See, for example, N. Gloembergen, "The Stimulated Raman Effect," Amer. J. of Phys. 35, 11, 983 (Nov. 1967), and A. Z. Grasyuk, "Raman Lasers," Sov. J. Q. Electr, 4, 3, 269 (Sept. 1974). High efficiencies of the order of 60% have been obtained for the conversion of laser beams to frequencies offset from the original laser frequency by an amount corresponding to the vibrational frequency of the molecular species utilized in the Raman cell (utilizing conversion into the first Stokes order). Quantum efficiencies as high as 90% were obtained by Grasyuk for the conversion of laser energy into the first Stokes order. A. Z. Grazyuk, "Raman Lasers," Sov. J. Quant. Elect., 4, 3, 276 (Sept. 1974). However, Grasyuk selected amplifier operating conditions so as to avoid the conversion of energy into Stokes components higher than the first. As a consequence, the translation in frequency by the Stokes device was limited to the vibrational frequency of the molecular species utilized in the Raman cell.

Larger translations in the frequency of the converted radiation have been obtained by use of higher order Raman scattering where the generated frequency is offset from the laser frequency by several times the vibrational frequency of the molecule (n-times for the n'th Stokes order), but the conversion efficiencies obtained in the prior art are low. See, e.g. T. R. Loree, R. C. Sze, and D. L. Barker, "Efficient Raman Shifting of ArF and KrF Laser Wavelengths," Appl. Phys. Letter, 31, 1, 37 (July 77).

Very large translations in frequency to the microwave region of the spectrum with high efficiency have been described using two laser beams of different frequencies mixing within a magneto-gas plasma. See, e.g. U.S. Pat. No. 3,546,477. However, the latter conversion device emits radiation primarily in the microwave region of the spectrum rather than in the optical region.

SUMMARY OF THE INVENTION

The invention described here allows the efficient conversion of laser radiation to beams of radiation at frequencies in the optical region that differ from the frequency of the original laser beam by several times the change obtained by first order Raman scattering. Quantum efficiencies approaching 100 percent are obtained by conversion of most of the radiation into a selected, single, higher order Stokes component.

A first part of the beam emitted by the laser is concentrated by a telescope to a sufficiently high power density so as to initiate Stokes-Raman oscillation within a Raman oscillator cell through which the beam passes. The Stokes-Raman radiation of various Stokes orders which exits from this cell may be spatially filtered to obtain beams of good spatial quality and thereby improve the conversion efficiency. The radiation then passes through a filter which transmits all of the Stokes orders up to the selected order, but stops all the orders with longer wavelengths. The cross section of the Stokes beams exiting from the filter is expanded by a second telescope, then superimposed on the second part of the original laser beam and caused therewith to pass through a Raman amplifier cell. The power density of the laser beam as it passes through the Raman amplifier cell is adjusted so as to be sufficiently high to saturate the amplification mechanism for the Stokes waves but to be less than that necessary to initiate Raman superfluorescence. By selecting the path length within the Raman amplifier cell and by adjusting the intensity of the pump and the injected Stokes orders in the Raman amplifier cell, most of the converted energy which exits from the Raman amplifier cell is concentrated into a single, higher order, Stokes wave. As a consequence, the laser beam is efficiently converted into a selected Stokes order, without significant excitation of four-wave mixing processes which otherwise would reduce the efficiency. To maximize the conversion efficiency, the divergence of the pump and Stokes beams are kept low so that the spatial profiles of these beams are nearly rectangular.

DESCRIPTION OF THE PREFERRED EMBODIMENT

Figure 1:
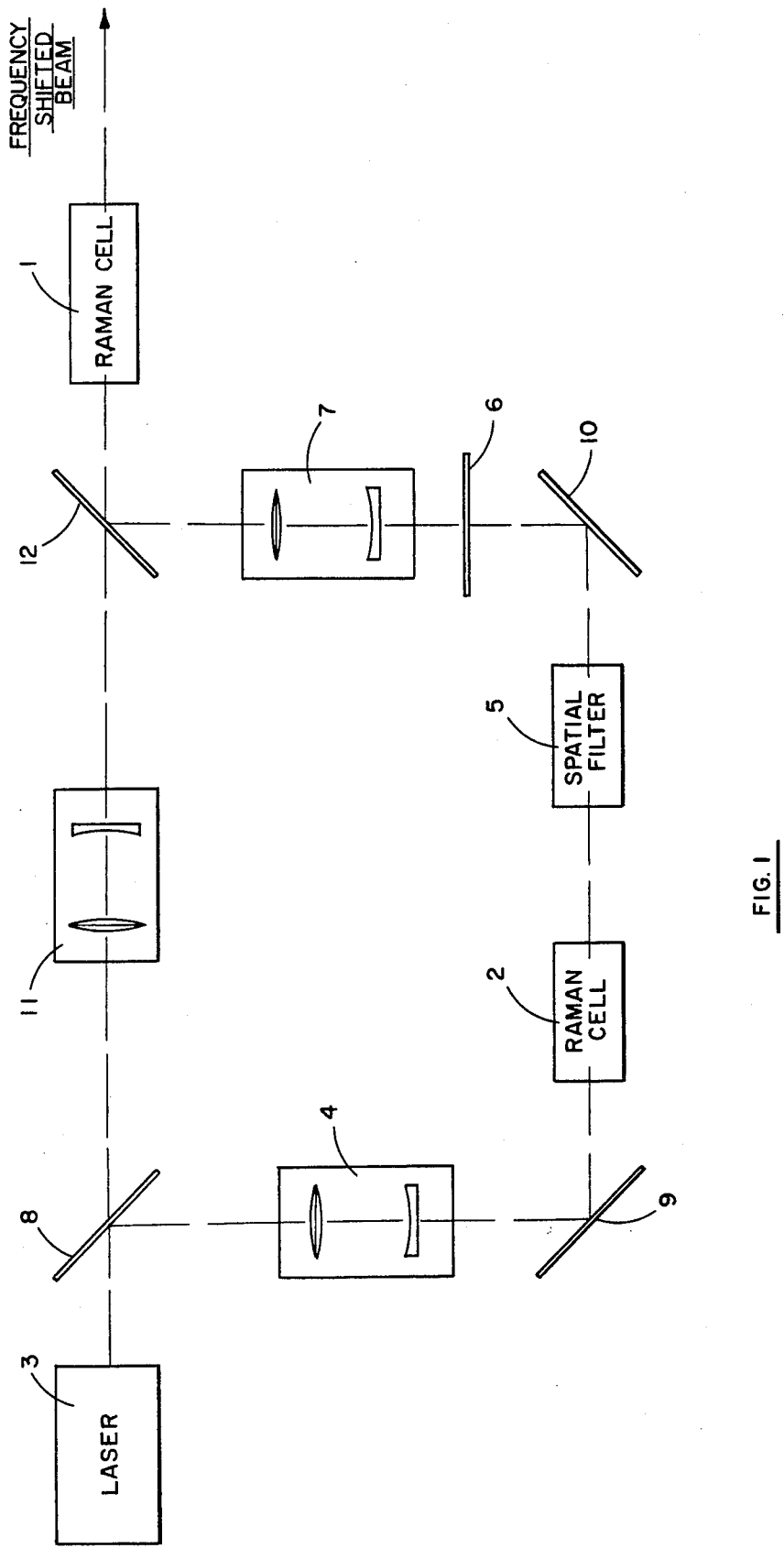
FIG. 1 is a diagram of the invention.

Referring now to FIG. 1. Raman cells 1 and 2 each contain a gas such as hydrogen, at a pressure of several atmospheres. Laser 3 emits a beam of radiation which is converted by this invention in a new beam of radiation which has been translated in frequency by an amount equal to several times the vibrational frequency of the molecules contained in the Raman cells 1 and 2 (higher Stokes order scattering).

The beam of radiation emitted by laser 3 is incident on beam splitter 8. Beam splitter 8 reflects approximately 5 to 10 percent of the incident laser beam through telescope 4. The remainder of the incident laser beam passes directly through beam splitter 8. The reflected portion of the beam is condensed by telescope 4 and after reflection by mirror 9 then passes through Raman cell 2. The telescope 4 is selected so as to condense the radiation by a factor which is chosen so that the radiation, as it passes through Raman cell 2, is several times above the threshold required to cause Raman cell 2 to function as a single pass Raman oscillator. For this reason, accordingly, Raman cell 2 is referred to as the Raman oscillator cell.

As a typical example of operating parameters in an operational embodiment where hydrogen gas at a pressure of 10 atmospheres is used as the Raman medium in a 1-meter long cell, and for a laser emitting at 3000 Å, the threshold intensity is approximately 30 MW/cm$^2$, and the Raman oscillator may be operated at 6 times above threshold in a case where 3 Stokes orders are desired.

In Raman cell 2, most of the laser energy is converted into various Stokes orders. The Stokes beams exiting Raman cell 2 optionally then pass through spatial filter 5, where they are spatially filtered to reduce their divergence and then are reflected by mirror 10 into filter 6 which transmits all the Stokes orders up to a selected order. The selected order is that order of Stokes radiation into which most of the radiation will be converted. Filter 6 stops all orders higher than the selected order. Spatial filter 5 is not necessary to the operation of the invention; however, its inclusion increases the efficiency of the conversion process if the beam quality of the oscillator is poor.

The remainder of the beam radiated by laser 3, which passes through beam splitter 8, then passes through telescope 11, through beam splitter 12, and then through Raman cell 1. Telescope 11 is selected such that the radiation passing through it is condensed by a factor which is chosen such that Raman cell 1 functions as a Raman amplifier and such that the power density of the radiation in the Raman cell 1 is optimized for generation of the selected Stokes order. For this reason, Raman cell 1 is referred to as the Raman amplifier cell.

If the energy density of the laser beam which passes through beam splitter 8 is such that no condensing or enlargement of the cross section of the beam passing through beam splitter 8 is required in order to optimize generation of the selected Stokes order, then telescope 11 can be omitted and is not then necessary to the operation of this invention.

For the embodiment having a 2-meter long amplifier cell with hydrogen gas at 10 atmospheres, and a laser wavelength of 3000 Å, the intensity required for efficient generation of the third Stokes order at 4792 Å is approximately 10 MW/cm².

The cross section of the Stokes orders transmitted through filter 6 is expanded in telescope 7 to approximately the same size as that of the laser beam as it exits from telescope 11 and enters Raman cell 1. Finally, beam splitter 12 reflects the various Stokes orders exiting from telescope 7 into Raman cell 1, while at the same time transmitting the laser radiation exiting telescope 11, such that the cross section of Stokes orders and the radiation from telescope 11 approximately coincide as they pass through Raman cell 1.

The power densities of the laser beam and of the various Stokes orders incident on the Raman cell 1 are adjusted for maximum conversion into the selected higher Stokes order. This requires, typically, that the power density of each of the Stokes orders incident on Raman cell 1 be on the order of 1 percent of the pump power density. In addition, by using an oscillator cell 2 with a low Fresnel number or by use of spatial filter 5, the divergence of the Stokes beam can be limited so as to avoid four-wave mixing, which otherwise would reduce the efficiency and degrade the beam quality of the selected Stokes order. Finally, the cross sections of the laser and of the Stokes beams are arranged so as to remain approximately constant as they traverse Raman cell 1 in order to obtain quantum efficiencies approaching 100 percent. It is understood that the function of Raman cells 1 and 2 can be fulfilled by a single Raman cell with four ports. The path within the single cell between the first and second ports would function as Raman cell 1 and the path within the cell between the third and fourth ports would function as Raman cell 2.

Figure 2:
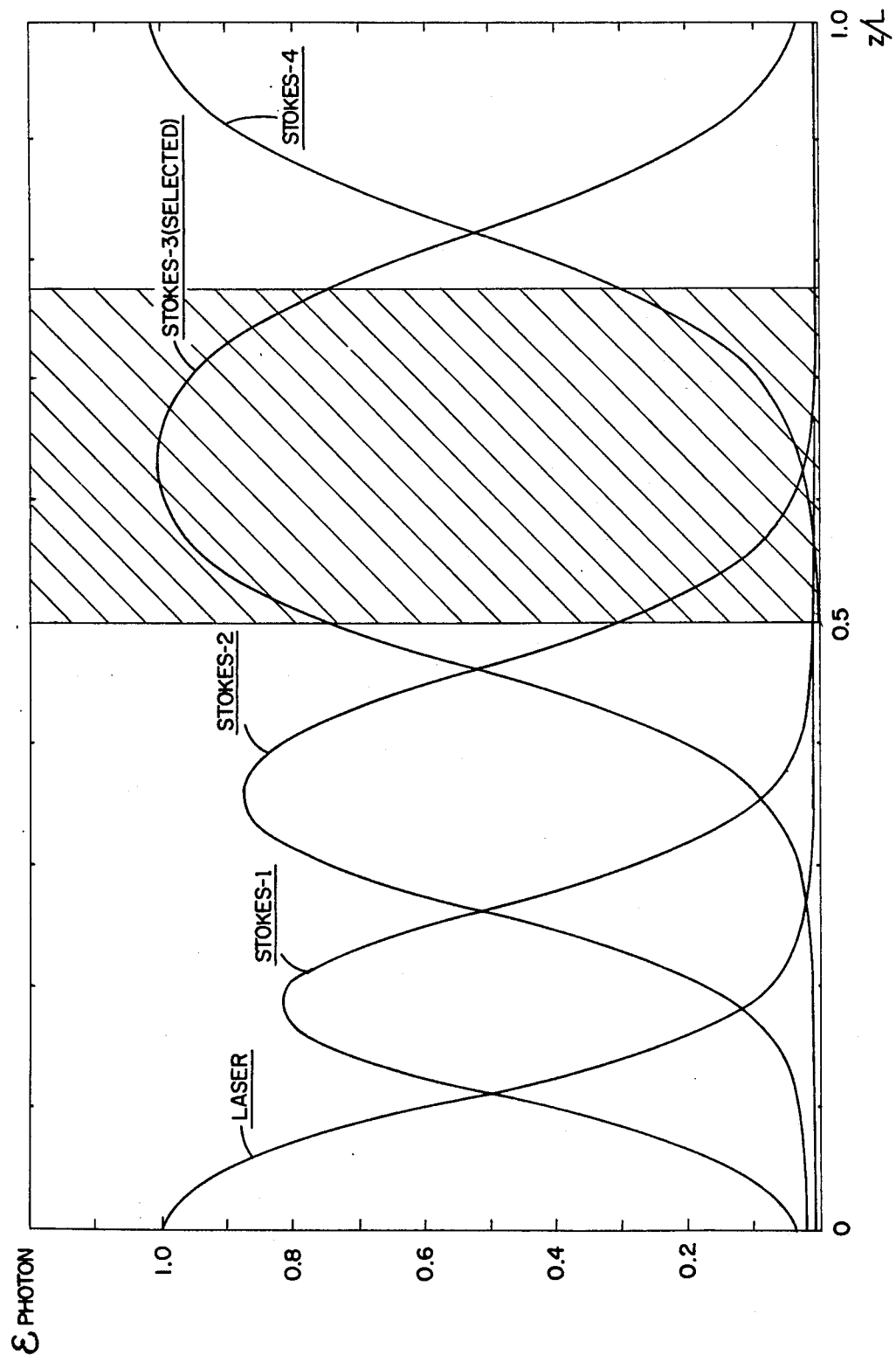
FIG. 2 is a diagram of the magnitudes of different orders of Stokes waves generated within the Raman cell.

Referring now to FIG. 2, which illustrates the sequence in which energy is transferred from the laser beam into the first Stokes order and thence into the second Stokes order, etc. as the energy transverses Raman cell 1. When the Stokes beams, i.e., the beams exiting telescope 7 and reflected by beam splitter 12, and the laser beam from telescope 11 first enter Raman cell 1, the first Stokes order is amplified by interaction with the laser beam in Raman cell 1, until nearly all the laser energy has been transferred to the first Stokes wave. After the energy has traversed a sufficient portion of Raman cell 1, such that the power density of the first Stokes wave has been amplified sufficiently. This first Stokes order starts amplifying the second Stokes order which then increases in energy and eventually depletes the first Stokes order. As illustrated in FIG. 2, this process repeats itself from each Stokes order to the next higher order as the energy progresses through Raman cell 1 until most of the laser energy has been transferred to the higher, selected Stokes order.

By an appropriate selection of the Raman cell length, the conversion process can be controlled such that nearly all of the energy exiting Raman cell 1 is contained in one selected Stokes order. Conversely, for a given length, the power densities of the laser and of the Stokes orders can be selected to concentrate the energy exiting Raman cell 2 into the selected Stokes order. One chooses a convenient length and finds the required power densities from data obtained from computer simulations of the multi-order, Raman amplifier steady-state differential equations that describe the conversion process within the Raman amplifier cell, namely:

$$\frac{dE_n}{dz} = -i\gamma \bar{\omega}_n [Q^* E_{n+1} e^{ik_{n+1}z} + Q E_{n-1} e^{ik_{n-1}z}] e^{-ik_n z}$$

$$q = -i\beta \sum_m E_m E^*_{m-1} e^{i(k_m - k_{m-1})z}$$

where:
$E_n$ = complex field amplitude $n$ = order index $\begin{cases} n = 0 \text{ pump} \\ n < 0 \text{ Stokes} \\ n > 0 \text{ anti-Stokes} \end{cases}$ $\bar{\omega}_n$ = normalized frequency $\equiv \omega_n/\omega_{-1}$
$k_n$ = wave vector of wave frequency $\omega_n$
$Q$ = molecular vibration amplitude
$\gamma, \beta$ = coupling coefficients with $\beta\gamma = g/4\eta$
$g$ = Raman gain coefficient (which depends on molecule)
$\eta$ = impedance of free space In the example of FIG. 2 described here, most of the energy exiting Raman cell 1 is contained in the third Stokes order. The generation of the undesired fourth Stokes order, which is indicated in FIG. 2, is due to four-wave mixing processes, but its energy is kept very low by an appropriate choice of the experimental parameters, as explained above.

I claim:

1. A device utilizing higher order Stokes-Raman scattering for converting a beam of radiation from a laser into radiation at other wavelengths comprising:
   (a) a gaseous Raman oscillator cell,
   (b) a gaseous Raman amplifier cell,
   (c) a laser which emits a beam of laser energy,
   (d) a first beam splitter which splits the beam emitted by the laser into first and second parts, the first part being reflected by the first beam slitter and the second part passing through the first beam splitter,
   (e) a first telescope oriented such that the first part of the laser beam passes through it after leaving the first beam splitter, which first telescope acts on the first part of the laser beam to reduce its cross section and thereby to concentrate the energy density of the first part of the laser beam, (f) first reflecting means for reflecting radiation, oriented so as to direct the first part of the laser beam, after exiting from the first telescope, into the Raman oscillator cell, so as to pass through the Raman oscillator cell and so that any unconverted portion thereof exits from the Raman oscillator cell, the energy density of the first part of the laser beam being sufficiently concentrated by the first telescope such that its power density within the Raman oscillator cell exceeds the threshold necessary to initiate the generation of Stokes-Raman radiation of various Stokes orders, part of which radiation is emitted from the Raman oscillator cell, together with the unconverted portion of the first part of the laser beam, (g) frequency filter means for transmitting only Stokes order radiation up to and including a selected order and for not transmitting Stokes-Raman radiation of higher orders than the selected order, (h) a second reflecting means for reflecting radiation oriented so as to reflect the Stokes-Raman radiation emitted from the Raman oscillator cell into the frequency filter means, (i) a second telescope oriented such that the filtered Stokes-Raman radiation transmitted by the frequency filter means passes through the second telescope, (j) a second beam splitter which transmits the second part of the laser beam and reflects the Stokes-Raman radiation emitted from the second telescope so as to superimpose the Stokes-Raman waves upon the second part of the laser beam, (k) said second telescope expanding the cross section of the Stokes-Raman radiation so as to reduce the energy density thereof and so as to cause the cross section thereof to be comparable to that of the second part of the laser beam after it has passed through the second beam splitter means, (l) the laser, the second beam splitter and the Raman amplifier cell being so oriented so that the second part of the laser beam which is transmitted by the second beam splitter, together with the Stokes-Raman radiation reflected by the second beam splitter, both enter and traverse the Raman amplifier cell along approximately the same path, (m) the length of the path through the Raman amplifier cell and the power densities of the second part of the laser beam and of the Stokes-Raman radiation entering the Raman amplifier cell being adjusted so as to concentrate most of the energy exiting from the Raman amplifier cell into one, higher order, Stokes-Raman beam of radiation.

2. The device as claimed in claim 1 and also including a third telescope placed in the path of the second part of the laser beam after it passes through the first beam splitter and before it passes through the second beam splitter so as to condense or expand the cross section of the second part of the laser beam.

3. The device as claimed in claim 2 and also including spatial filtering means for forming a highly collimated beam which spatial filtering means is placed between the Raman oscillator cell and the second reflecting means so as to collimate the Stoke-Raman radiation emitter from the Raman oscillator cell.

4. The device as claimed in claim 1 and also including spatial filtering means for forming a highly collimated beam which spatial filtering means is placed between the Raman oscillator cell and the second reflecting means so as to collimate the Stokes-Raman radiation emitter from the Raman oscillator cell.

5. A device utilizing higher order Stokes-Raman scattering for converting a beam of radiation from a laser into radiation at other wavelengths comprising:

(a) splitter means for splitting the beam of radiation from the laser into first and second parts, (b) Raman oscillator means for generating Stokes-Raman radiation of various Stokes orders from the first part of the beam of radiation, (c) filter means for receiving the Stokes-Raman radiation from the Raman oscillator means and for transmitting only Stokes order radiation up to and including a selected order, (d) superimposing means for superimposing the Stokes-Raman radiation transmitted by the filter means upon the second part of the beam of radiation from the laser, (e) Raman amplifier means for receiving the second part of the beam of radiation from the laser together with the Stokes-Raman radiation superimposed thereon by the superimposing means and for amplifying the Stokes-Raman radiation, (f) the length of the path through the Raman amplifier means and the power densities of the second part of the laser beam and of the Stokes-Raman radiation entering the Raman amplifier means being designed so as to concentrate most of the energy exiting from the Raman amplifier means into one, higher order, Stokes-Raman beam of radiation.

* * * * *